United States Patent [19]
Feiner et al.

[11] Patent Number: 5,524,187
[45] Date of Patent: Jun. 4, 1996

[54] WORLDS-WITHIN-WORLDS NESTED DISPLAY AND INTERACTION SYSTEM AND METHOD

[75] Inventors: Steven K. Feiner; Clifford M. Beshers, both of New York, N.Y.

[73] Assignee: The Trustees of Columbia University, New York, N.Y.

[21] Appl. No.: 299,812

[22] Filed: Sep. 1, 1994

Related U.S. Application Data

[63] Continuation of Ser. No. 675,579, Mar. 25, 1991, abandoned.

[51] Int. Cl.$^6$ ................................................ G06F 15/62
[52] U.S. Cl. ........................... 395/119; 395/153; 395/154
[58] Field of Search ........................... 395/119, 140, 395/120, 127, 133, 152, 155, 157, 161, 153, 154; 340/723

[56] References Cited

U.S. PATENT DOCUMENTS 4,988,981   1/1991   Zimmerman et al. ................... 340/709

OTHER PUBLICATIONS

"Calculus with analytic geometry", Howard Anton, 1980, John Wiley & Son Inc. pp. 864–874.
"A computer technique for displaying n–dimensional hyperobjects", CACM, 10:8, 1967, pp. 469–473, A. Michael Noll.
"Real Time 4D Animation on A 3D graphics workstation", Beshers et al., Graphic Interface '88, Jun. 6–10, pp. 1–7.
"A Hand Gesture Interface Device", Zimmerman et al., Pro. CHi+Gi 1987, pp. 189–192.
E. J. Farrell, "Visual Interpretation of Complex Data", IBM Systems Journal, vol. 26 (1987), pp. 174–200.
W. C. Donelson, "Spatial Management of Information", Computer Graphics (ACM SIGGRAPH), vol. 12 (1978), pp. 203–209.
T. Mihalisin et al., "Visualizing a Scalar Field on an N–dimensional Lattice", IEEE Proceedings on Visualization, 1990.

J. LeBlanc et al., "Exploring N–dimensional Databases", IEEE Proceedings on Visualization, 1990, pp. 230–237.
E. R. Tufte, "Envisioning Information", Graphics Press, 1990, pp. 67–69.
I. Sutherland, "The Ultimate Display", Proc. IFIP 65, 1965, pp. 506–508.
T. Zimmerman et al., "A Hand Gesture Interface Device", Proc. CHI+GI 1987, pp. 189–192.
M. Ouh–young et al., "Force Display Performs Better than Visual Display in a Simple 6–D Docking Task", Proc. IEEE Robotics and Automation Conf., 1989, pp. 1462–1466.
S. Bly, "Communicating with Sound", Proc. CHI '85, 1985, pp. 115–119.
M. Noll, "A Computer Technique for Displaying n–Dimensional Hyperobjects", CACM 10:8, 1967, pp. 469–473.
C. Beshers and S. Feiner, "Real–Time 4D Animation on a 3D Graphics Workstation" Graphics Interface '88, Jun. 6–10, 1988, pp. 1–7.
R. W. Scheifler et al., "Overview of the X Window System", X Window System C Library and Protocol Reference, Digital Press, 1988, pp. 4–7.

*Primary Examiner*—Mark R. Powell
*Assistant Examiner*—Huynh Ba
*Attorney, Agent, or Firm*—Brumbaugh, Graves, Donohue & Raymond

[57] ABSTRACT

Nested coordinate systems are used for the display and manipulation of multivariate data in any field including science, engineering, economics, demographics, business, and finance. A first, inner coordinate system contains a display corresponding to a subset of the variables while the other variables are held constant. Each axis of a second, outer coordinate system is associated with an additional variable. The coordinates of a distinguished point in the first coordinate system (e.g., its origin) fix a value for each of the outer coordinate system's variables that is held constant within the inner coordinate system and its descendants for the evaluation of data displayed within them. Analogously, the second coordinate system may be recursively nested in one or more additional coordinate systems to allow the system to handle an arbitrary number of variables. Each coordinate system may be of arbitrary dimension, 1-, 2-, and 3-D coordinate systems being most familiar to a user.

15 Claims, 7 Drawing Sheets

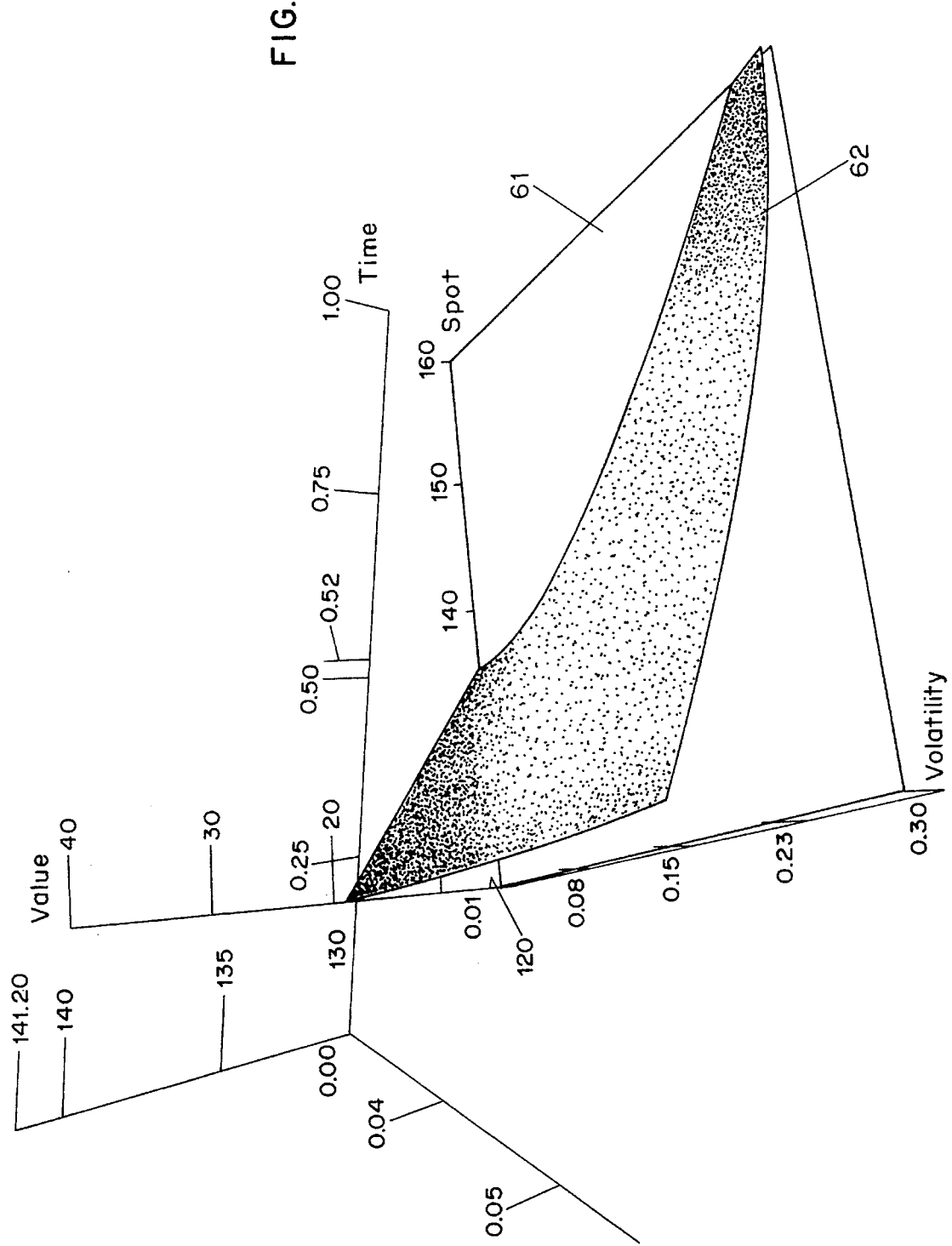

WORLDS-WITHIN-WORLDS NESTED DISPLAY AND INTERACTION SYSTEM AND METHOD

SPECIFICATION

This application is a continuation of application Ser. No. 07/675,579, filed on Mar. 25, 1991, now abandoned.

BACKGROUND

The present invention relates to the display of and interaction with multivariate data.

While univariate data (i.e., pairs of numbers) can be displayed readily in an x-y coordinate system on a plotter or a computer screen, methods for the display multivariate data are not as immediately obvious. For bivariate data, graphics research has long been developing true 3-dimensional (3-D) interaction devices (see, e.g., I. Sutherland "The Ultimate Display" Proc IFIP 65 1965, pp 506–508); however, it is only over the past decade that high-performance 3-D graphics workstations have been coupled with commercially available 3-D devices, e.g., polarized liquid-crystal shutters for stereo viewing, head-mounted displays, and a so-called DataGlove device (see T. Zimmerman et al., "A Hand Gesture Interface Device", Proc. CHI+GI 1987, pp. 189–192.)

In a variety of fields, e.g., science, engineering, economics, demographics, business, and finance, there are applications in which it is important to explore and manipulate four- and higher.-dimensional data in the form, e.g., of functions of three or more variables. In such applications, data can be represented by points in (Euclidean) n-dimensional space. The position of a point is then specified with n coordinates, each of which determines its position relative to one of n (mutually perpendicular) axes. In some cases, the multivariate data being presented has a familiar 3-D interpretation; e.g., as described by M Ouh-young et al., "Force Display Performs Better than Visual Display in a Simple 6-D Docking Task", Proc. IEEE Robotics and Automation Conf., 1989, pp. 1462–1466, users may explore a 6-dimensional space to find the energy minimum of positioning and orienting a rigid object in 3-space operated on by forces and torques. The user sees a representation of the forces and torques as vectors of varying length or actually feels them through force-feedback manipulators. Another approach is described by S. Bly in "Communicating with Sound" (W. Buxton, moderator), CHI '85 Proceedings (ACM), 1985, pp. 115–119, where reference is made to a demonstration showing that users have the ability to distinguish between multivariate data presented sonically by varying seven characteristics of a musical note: pitch, volume, duration, attack envelope, wave shape, and the addition of fifth and ninth harmonics. Typically, however, in the presentation of abstract multivariate data, nonvisual properties are mapped to visual properties, e.g., position, color, and texture, that can be represented in a display. One possibility is to generalize 3-D modeling transformations and viewing projections to higher dimensions; see, e.g., M. Noll, "A Computer Technique for Displaying n-Dimensional Hyperobjects" CACM 10:8, 1967 pp. 469–473. However, although systems based on these concepts are useful research tools, an intuitive understanding of the resulting displays is often difficult to acquire.

One common approach to reducing the complexity of a multivariate function is to hold one or more of its independent variables constant. Each constant corresponds to taking an infinitely thin slice of the space perpendicular to the constant variable's axis, thereby reducing the space's dimensions. For example, if the dimension is reduced to 3, the resulting slice is a 3-D height field and represents a function of two variables that can be manipulated and displayed using a conventional 3-D graphics system.

Ostensibly, this simplification is at the expense of dimensions "sliced away" by holding variables constant, and it is a purpose of the invention to "add back" such dimensions in a controlled fashion as described in the following.

SUMMARY OF THE INVENTION

Multivariate data, e.g., functions of several independent variables, multivalued functions, and general relations between two or more variables are visualized or otherwise displayed by a computer system as follows: a display is produced in a first or inner coordinate system corresponding to a first subset of the given variables, and the resulting display is placed in a second or outer coordinate system corresponding to a second subset of variables. Each axis of a second, outer coordinate system is associated with an additional variable. The coordinates of a distinguished point in the first coordinate system (e.g., its origin) fix a value for each of the outer coordinate system's variables that is held constant within the inner coordinate system and its descendants for the evaluation of data displayed within them. If the outer coordinate system is chosen to contain only some of the remaining variables, the combined first and second coordinate systems may be displayed in a third coordinate. system—and so on, recursively, until as many variables as desired are accounted for.

Preferably, a display system or method includes additional features, e.g., for scaling and rotating any coordinate system for the sake of ease of viewing, and for translating any inner system within any outer system to change all displays contained within that inner system in correspondence with the change of one or several outervariable values. Further preferred features include means for probing a displayed value and for comparing displayed data. A preferred embodiment of the invention may be used, e.g., in the evaluation of financial transactions such as foreign-currency options trades.

Conveniently, in accordance with a further aspect of the invention, the display and manipulation of nested coordinate systems is facilitated by use of a 3-D window system capable of organizing and displaying 3-D spatial regions (e.g., in an oriented tree structure).

BRIEF DESCRIPTION OF THE DRAWING

FIG. 6 is a perspective display produced in accordance with a preferred further embodiment of the invention, illustrating the use of a waterline display to examine a put option.

DETAILED DESCRIPTION OF PREFERRED EMBODIMENTS

Figure 1:
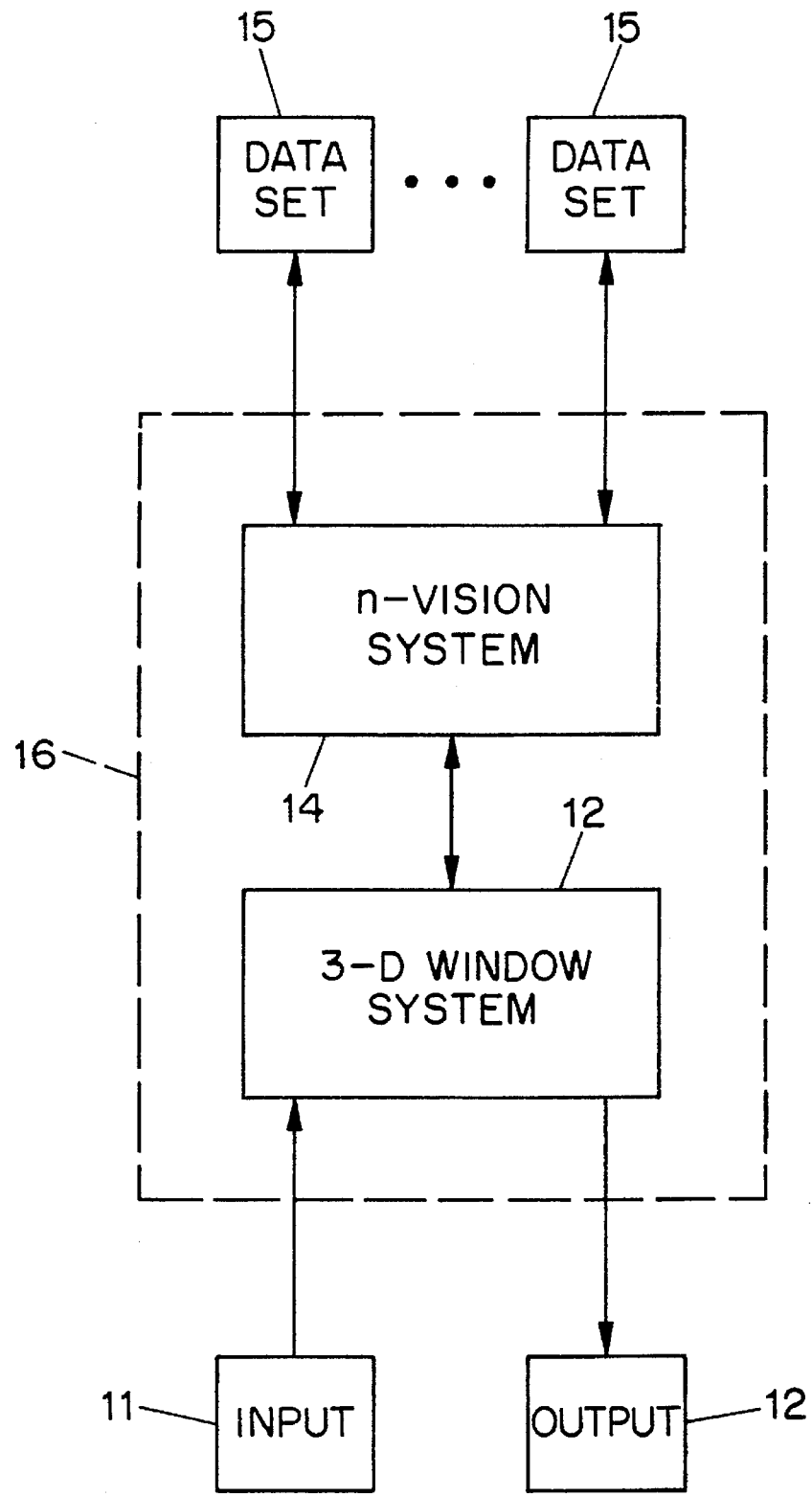
FIG. 1 is a schematic diagram of a display and interaction tom in accordance with a preferred embodiment of the invention.

A system called n-vision, representing a preferred embodiment of the invention and implemented in C++ to run on a real-time 3-D graphics workstation (e.g. an Hewlett-Packard 9000 375 TurboSRX™ workstation with hardware support for scan-conversion, shading, and z-buffer visible-surface determination) is schematically depicted in FIG. 1. Shown are user-interface input means 11 in communication with a 3-D window system 12 which in turn is in communication with output means 13, e.g., a 3-D display monitor. Window system 12 is further in communication with a system 14 called n-Vision, designed to interact with window system 12 in the production of graphics. Further in communication with n-Vision system 14 are data sets 15, e.g., data files, function generators, and real-time sources of data to be displayed by the system. Conveniently, systems 12 and 14 are stored in memory of one or several processors 16.

User-interface input is provided mainly through the use of an inherently 3-D interaction device, VPL-DataGlove™, as described in the above-identified paper by T. Zimmerman et al. DataGlove uses a magnetic sensor to sense the 3-D position and orientation of the user's hand. Fiber optic cables running along each finger monitor an additional ten degrees of freedom, determined by the positions of two joints on each of the five fingers. Further provided for user interaction are mouse-operated control panels and dial-and-button boxes. Visual output is displayed on a monitor viewed with liquid-crystal stereo glasses (CrystalEyes™ by StereoGraphics™), giving the user a strong sense of the three-dimensionality of the display.

In n-Vision, a space of interest is a 3-D hierarchy of nested 3-D "boxes" ("worlds within worlds") which may be understood conceptually as containers for presenting graphical output and capturing graphical input. The hierarchy is an oriented tree: siblings are assigned relative priorities that determine the order in which they are rendered and picked in case of overlap. Each box may be arbitrarily translated, scaled, and rotated relative to its "parent box." As illustrated in FIG. 2–6, boxes are displayed with their coordinate axes.

Production of the FIG. 2–6 involved the use of a software implementation of a preferred method for "financial visualization"—designed for users such as currency options traders interested in exploring the value of a portfolio of options to buy or sell foreign currency on a specified date at a specified price. An option to buy is referred to as a call, an option to sell as a put. Options that may only be exercised at a specified date are called European options. Each European option has a value that may be represented as a function of six variables: the price at which the currency can be bought or sold at maturity ("strike price"), the price at which the currency is selling now ("spot price"), the time remaining to the date at which the option may be exercised, the interest; rates for the domestic and foreign currencies, and the volatility of the market. These functions of six variables define surfaces in 7-space. Investors typically buy and sell combinations of different options that have been selected as part of an investment strategy that trades off risk against profit.

Figure 2:
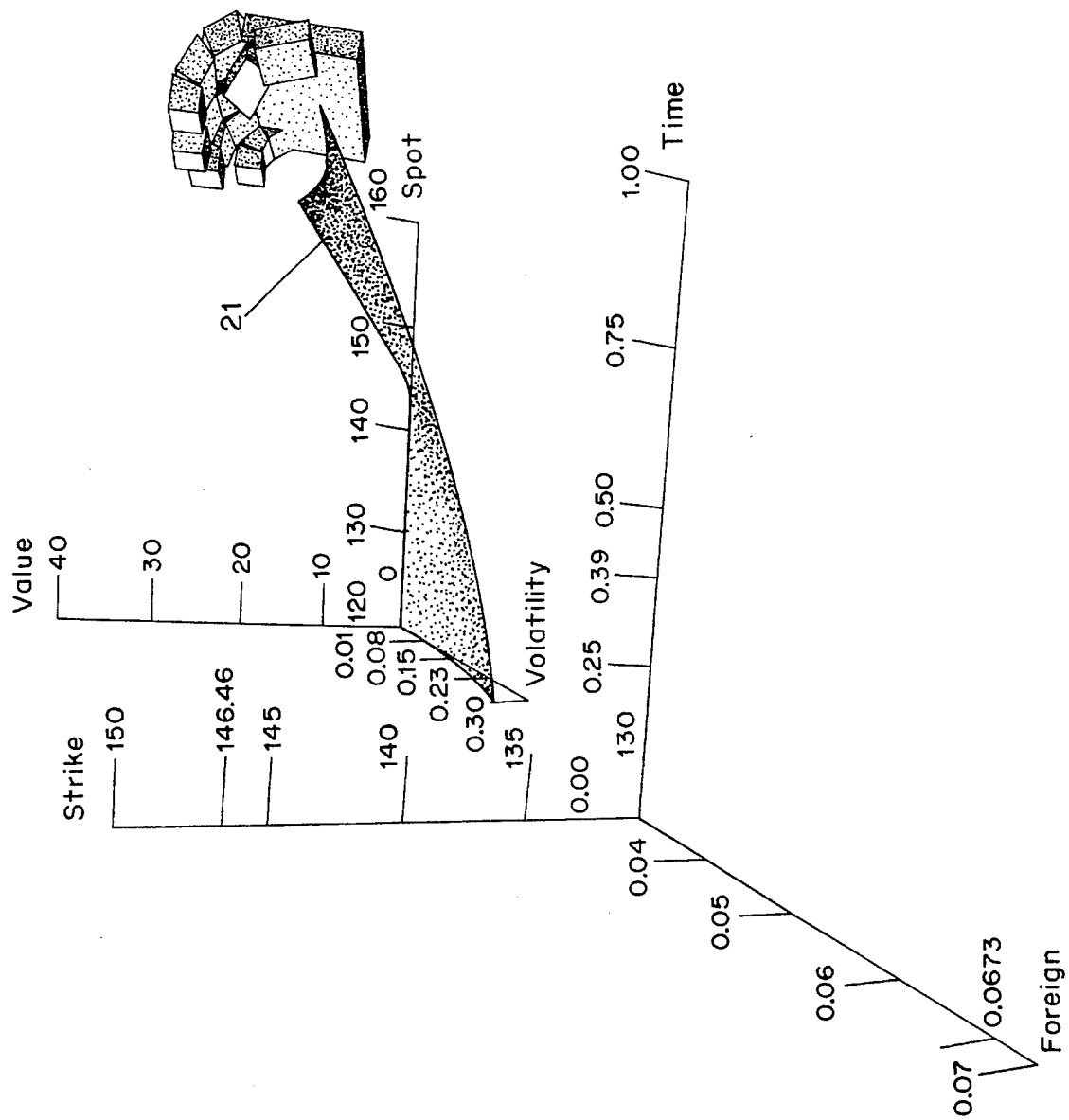
FIG. 2 is a perspective display which was computer-generated in accordance with a preferred embodiment of the invention, visually representing a call option in foreign-currency options trading.

FIG. 2 is an example of a call option whose value is represented as a height field 21 in a 3-D inner box or "world", plotted as a function of spot price and volatility. The outer world has axes of time to maturity, strike price, and foreign interest rate. (The domestic interest rate has been held constant and is not assigned to an axis.) Thus, the position of the inner world determines the time to maturity, strike price, and foreign interest rate used in evaluating the function. The position of the origin of the selected world's coordinate system is shown with selectable tick marks on the axes of its containing world's coordinate system. A user can move an inner world along a single outer-world axis by selecting and translating the appropriate tick mark. Additional tick marks may be used for other purposes, e.g., to mark a maximum or minimum of a function.

By making use of DataGlove "postures", for example, a user can translate a world at will. Translating a world that is within an outer 3-D world will change up to three otherwise constant variables, causing the display(s) within the world to change accordingly. Additional DataGlove postures allow the user to rotate or scale a selected world about its origin, which makes it possible for the world to be viewed from another angle or at another size (larger, e.g., for greater detail, smaller to make room for other displays), without modifying its variables. An accessed world may be highlighted for ease of user interaction. Also, kinesthetic feedback can help users visualize a functions being explored.

Figure 3:
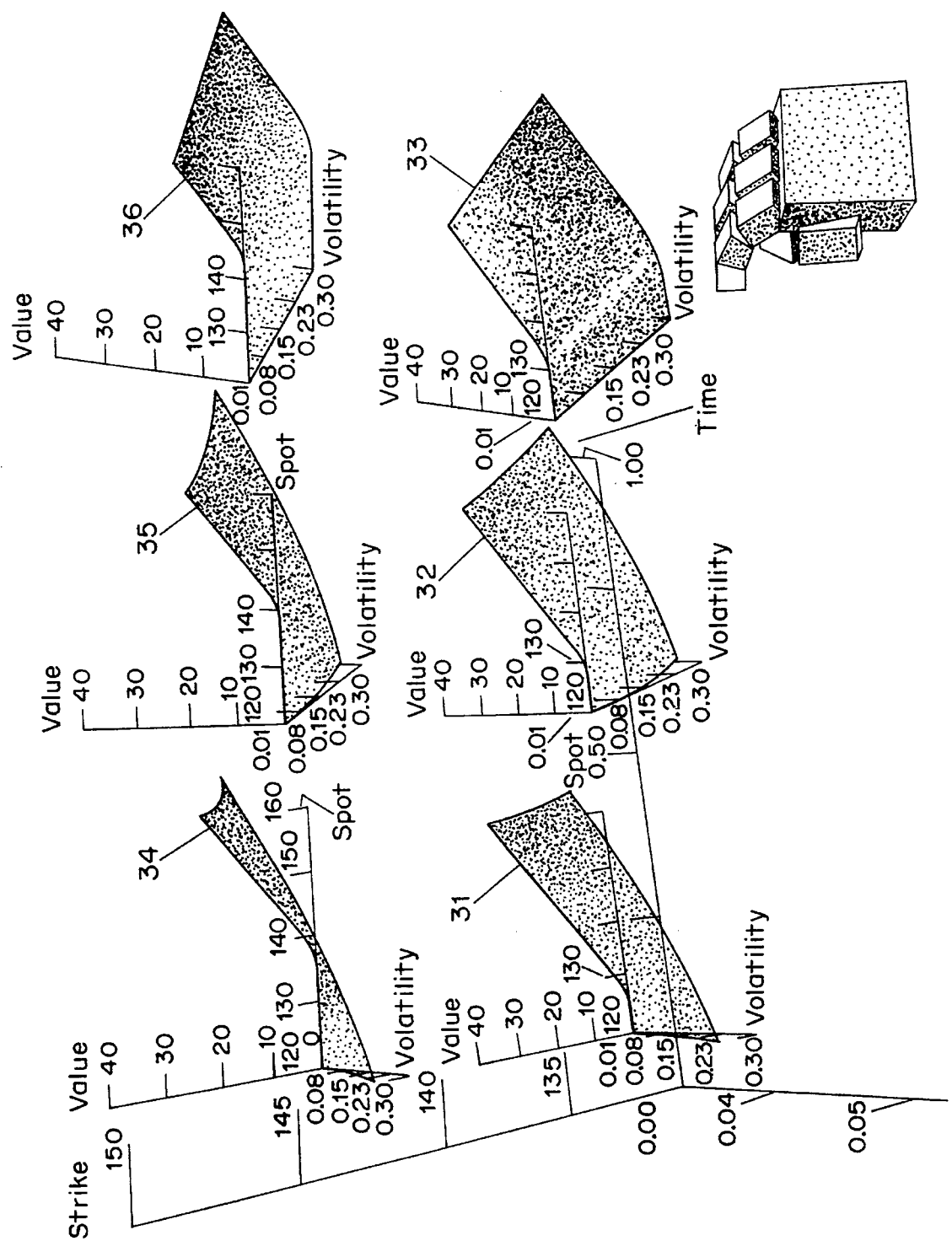
FIG. 3 is a perspective display produced in accordance with a preferred further embodiment of the invention, visually representing a plurality of call options.

Within a containing world, multiple copies of the same world or copies of different worlds can be deposited for visual comparison. Each copy, corresponding to its position, has a different constant set of values of the containing world's variables. For example, FIG. 3 shows an array of six inner worlds, each representing a call, 31–36. A Comparison of the calls, which vary only in strike price and time to maturity, indicates how market volatility has successively less effect as the time to maturity decreases, and how an increase in the price at which currency can be bought (strike price) makes for a lower profit.

Figure 4A:
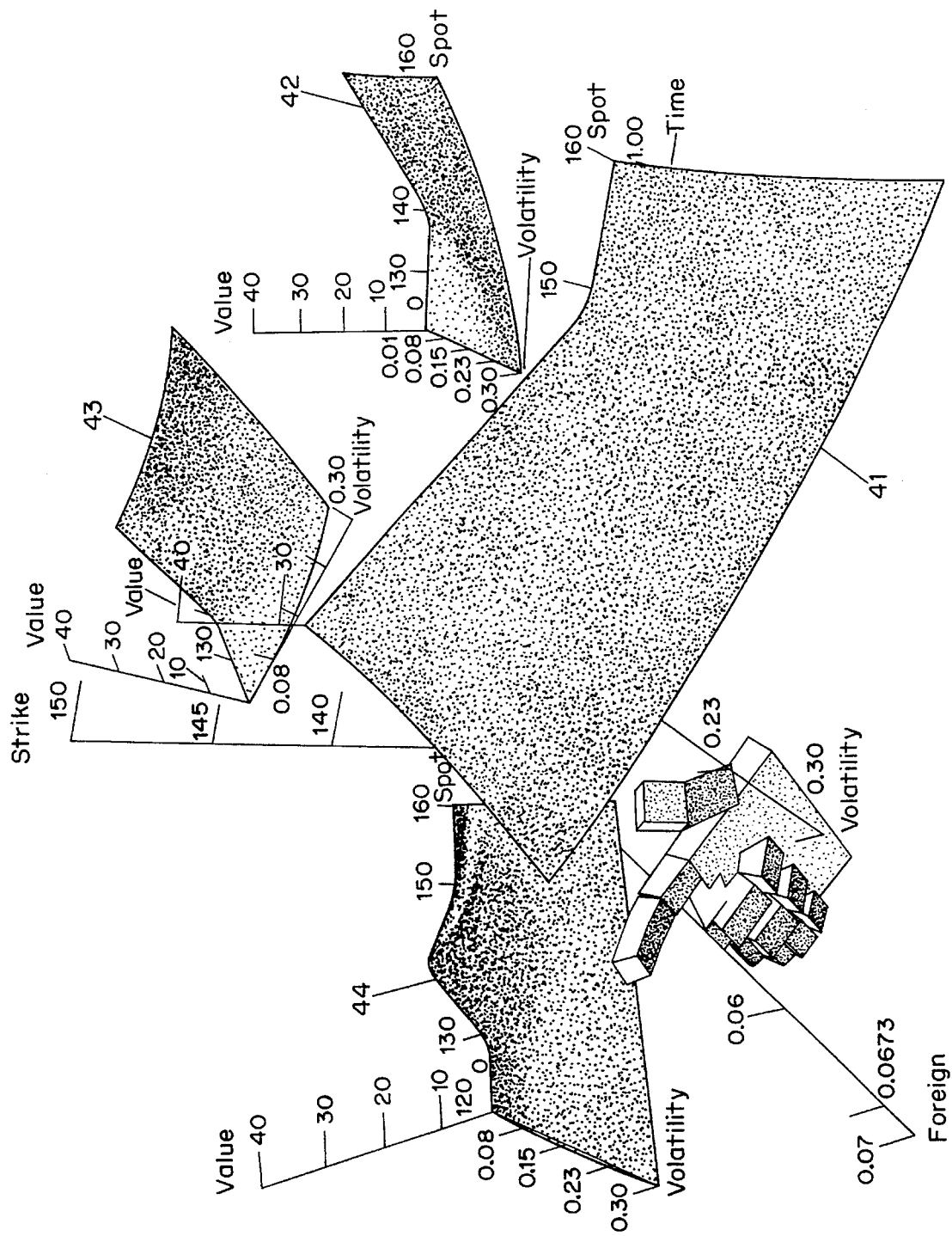
FIG. 4(a) and 4(b) are a perspective stereo pair produced in accordance with a preferred further embodiment of the invention, visually representing a put, two calls, and a butterfly spread in foreign-currency options trading.
Figure 4B:
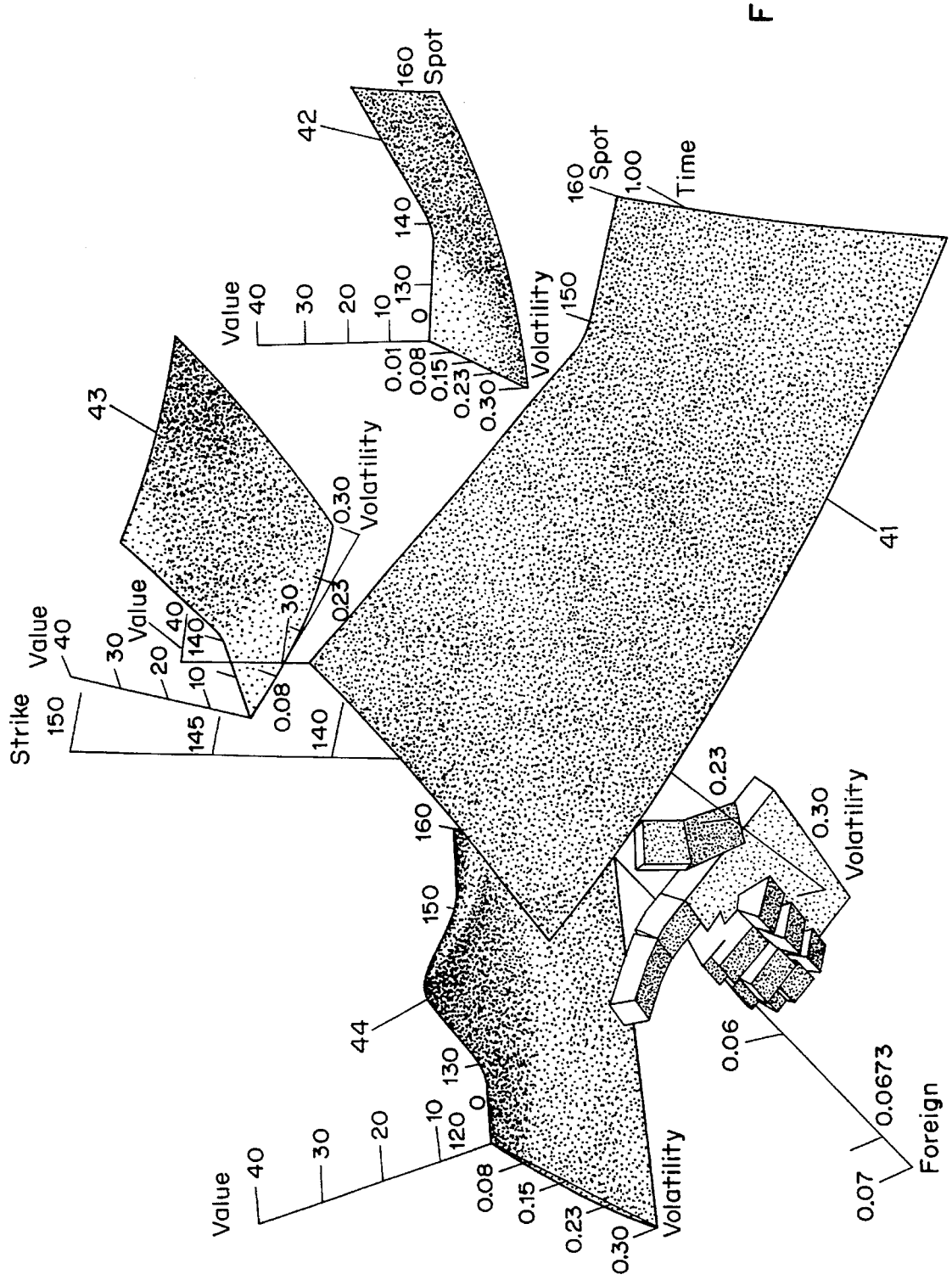

The stereo pair of FIG. 4(a) and (b), with FIG. 4 (a) as the left eye's image, shows a collection of worlds within a common containing world. The worlds include a put 41 (in the foreground), two calls 42 and 43, and a "butterfly spread" (the surface 44 at the left). A butterfly spread is a trading strategy in which call options for the same currency and maturity date are bought and sold. Two call options are sold with a strike price that lies within a range of strike prices established by buying one call with a lower strike price and one with a higher strike price. The strike price axis here controls only the price of the call options being sold.

Figure 5:
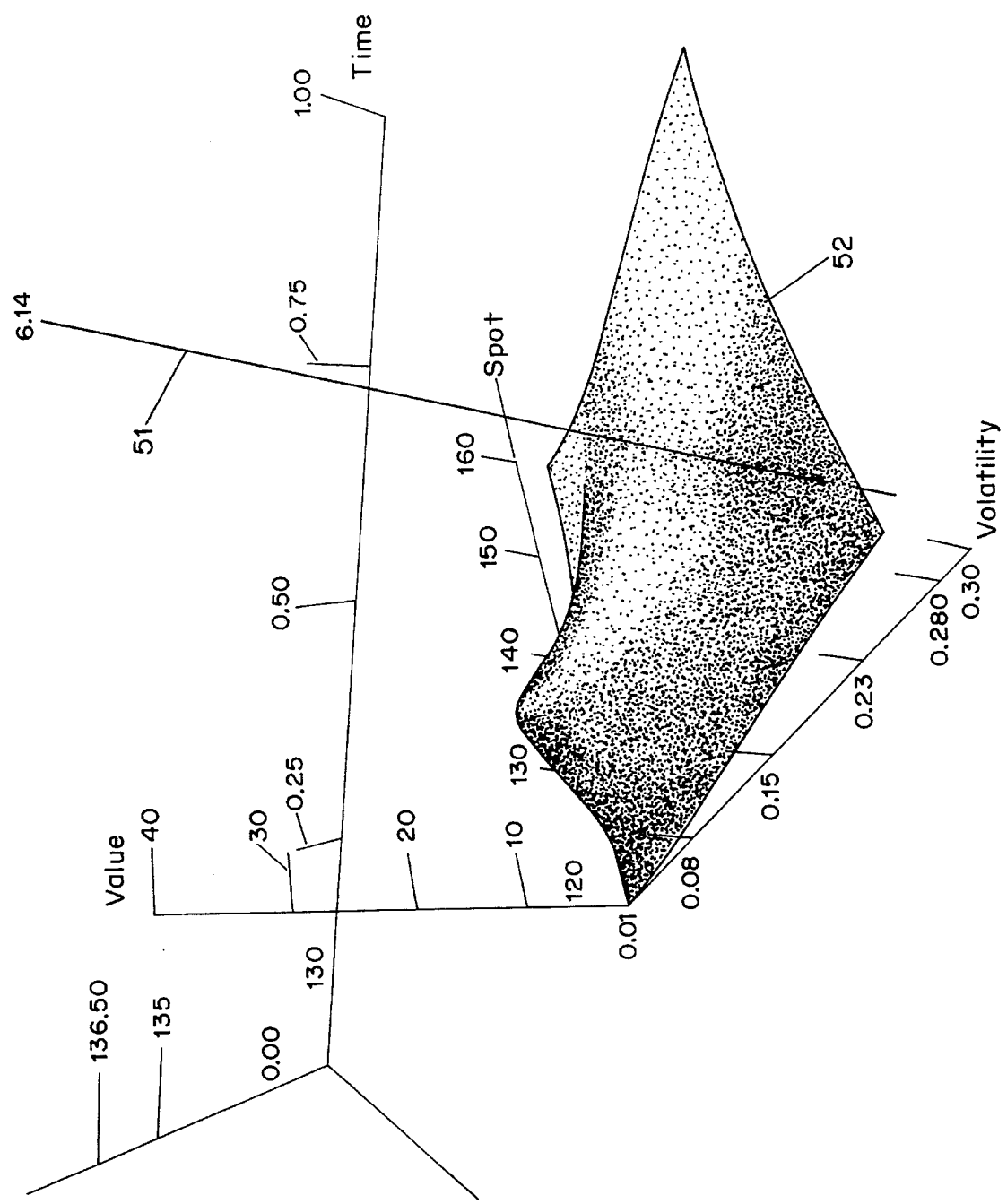
FIG. 5 is a perspective display produced in accordance with a preferred further embodiment of the invention, illustrating the use of a dipstick display for sampling a surface.

In n-Vision, users may explore worlds by using "tools" that are implemented by a kind of box called a toolbox. A toolbox is usually associated with a set of glove postures that specify when the user starts and stops using its tool. Each toolbox has access to all of the interaction device settings, Supported is a collection of tools, including a "dipstick", "waterline", and "magnifying box". The dipstick is a small probe that the user may pick up and move within a display; the 3-D dipstick is sensitive to motion parallel to the plane above which data is displayed, and reads out the value(s) of the data at the point it intersects. FIG. 5 shows a dipstick 51 being used to sample the value of a butterfly spread 52.

The waterline is a plane that is perpendicular to one of the axes in a world. It may be raised or lowered slice a surface. Since it is processed by the same visible-surface algorithm as is the rest of the world, it can be used to locate local minima and maxima visually. FIG. 6 shows a waterline 61 being used to explore the value of a put option 62. More generally, in any coordinate system, one might allow the display of several surfaces, e.g. corresponding to multivariate functions.

The 3-D magnifying box provides higher-resolution, display of part of another box. When a magnifying box is associated with another box, the actions performed in either of the boxes are reflected in the other.

The order in which variables are assigned to the nested coordinate axes has an effect on the surface displayed. The two variables assigned to an innermost 3-D world's axes determine the shapes produced, whereas the order in which variables are assigned to the ancestor worlds' axes determines the ease with which variables may be manipulated. For example, if multiple worlds are nested directly inside another world, then translating the common containing world modifies all its nested worlds in the same way. Thus, the easiest way to restrict a set of worlds to share the same variables is to nest them inside a world whose ancestry defines the desired variables. In order to avoid the effects of translating one or more worlds, they can be nested directly inside of a world whose coordinate system has no variable assigned to its axes. These first-level inner worlds can then be positioned without changing their contents, e.g., to place them next to other worlds for comparison. Rather than being limited to 3-D worlds, n-Vision provides support for worlds of from one to four dimensions, relying, in part, on techniques developed for transforming and displaying 4-D objects in real time, using 3-D graphics hardware; see C. Beshers et al., "Real-Time 4-D Animation on a 3-D Graphics Workstation", Proc. Graphics Interface '88, 1988, pp. 1–7. Furthermore, a system using the " worlds within worlds"approach might be designed for objects and coordinate systems of arbitrarily high dimensionality.

The combination of the DataGlove and stereo display was found to be particularly suited for picking and manipulating one of a number of worlds. The DataGlove's direct positional control allows the user to reach out and "grab" a world, rather than having to "steer" toward it. The stereo display provides visual feedback that makes 3-D positioning significantly easier, while also resolving ambiguities in the projections of individual surfaces. For example, the inner world in FIG. 2 is quite close to the nearest face of its containing world's box, as indicated by its tick marks. When viewed in stereo, the discrepancy in their distances is apparent even when tick marks are ignored.

Using a stylized hand as a cursor provides a mechanism for displaying the sixteen degrees of freedom that the DataGlove supports. But, feedback on all sixteen degrees of freedom is not usually necessary; e.g., when a user has selected an object for translation or rotation, the precise position of the fingers is of little consequence. Furthermore, there are situations in which control of multiple degrees of freedom could be exploited better than by positioning and orienting a virtual hand and its fingers. This capability is exploited in n-Vision by allowing "metamorphosis", turning the-hand into one or more tools, instead of just attaching the tools to the hand. For example, turning the hand directly into a dipstick as shown in FIG. 5 eliminates the visual interference of having the full hand rendered in the display, possibly obscuring part of a surface, when the surface need be probed only at a specific point. Mapping the hand to other more complicated tools may allow hand and finger motion to control nonanthropomorphic tool parts that move (or otherwise change) differently than the user's hand and fingers.

N-Vision includes a 3-D window system in which a box's coordinate system represents a transformation relative to that of its parent, and which includes features that are 3-D analoguss of features described for a 2-D window system by R. Scheifler et al., "X Window System C Library and Protocol Reference", Digital Press, 1988. Boxes may overlap and be of arbitrary shape so long as each box defines a 3-D volume. (Along these lines, 4-D, 5-D, and higher-dimensional analoguss are conceivable.) Each box represents an instance of a class that may be associated with "event handlers" that allow it to register for and react to a variety of different events. A box can map and unmap itself from the display. Mapped boxes are displayed and receive events for which they have registered; unmapped boxes are not displayed and do not receive events. By providing mapping and unmapping, n-Vision allows for the creation, of a "controller box" that "owns" a "child box" and maps and unmaps it as it sees fit. This makes it possible to implement a low-resolution or schematic stand-in for a more complex object. For example, a box that is being moved may unmap its children during the motion and then map them only after the motion has ceased.

Each box has a list of associated event handlers, which are objects that request specific event types and are notified whenever a requested event occurs and is routed to that box. Event types are designed to allow the application to track changes in the state of the system, including input arriving from a device, modifications to the box configuration, cursor movement across boxes, and box exposure. Event handlers are used to implement data dependencies among boxes and to support graphics that are rendered within a box.

The n-Vision system has a 3-D pointer that may be connected to any interaction device, typically the position sensor of the DataGlove. Whenever the 3-D pointer moves, a special box, called the "cursor box" is notified of the change. The cursor box differs from the other boxes in that it has a distinguishing "hot point" that determines where input events are routed, and a function that sets the cursor box geometry according to the state of the pointer. The cursor box can also be set directly by the applications.

Events are routed to the deepest box in the hierarchy On the highest priority branch that contains the cursor's hot point, excluding unmapped boxes and the cursor box. This is the "current box". The box system begins at the current box and searches upward in the hierarchy until it finds a box with at least one event handler for the desired event type. It then dispatches the event to all interested event handlers attached to this box (except in the case of "grabs" which are described below.)

Events are generated by the server when a box changes state. "Mapping events" are generated whenever a box is mapped or unmapped, whereas "geometry events" are generated whenever a box is scaled, translated, or rotated.

An application can also track the path from the hierarchy's root to the current box by enabling "enter event" and "leave events." An event is generated for each box whose boundary is crossed by the pointer. The events indicate whether the pointer entered or left the box, and whether or not the box is or was the current box or one of its ancestors. All boxes between the old and new current box are notified of the change in status. An enter or leave event is routed first to the box for which it was generated, and when up the, hierarchy to the lowest ancestor that has an event handler for the event.

The DataGlove can generate "posture events" that are triggered as it moves in and out of a set of user-definable postures that are contained in a posture table. Each posture consists of a set of ranges for the finger bend sensors. One can enter or leave a posture, much like pressing or releasing a button. Unlike conventional button events, however, only one posture may be realized at any one time. Entry into and out of a posture event is used by box event handlers to allow interaction device settings (e.g., the position and orientation of the DataGlove) to control the transformation of one or more boxes.

An event handler may grab a particular event type, such as pointer motion events. All grabbed events are routed exclusively to that event handler, rather than through the normal chain of event routing. This makes possible operations that control input events as long as they are active. Typically, posture-event handlers are designed such that the box to which the posture event is routed grabs the DataGlove motion events until the position is left. This allows a user to assume rotation and translation postures that retain control of the box, even though the cursor may leave the box. This can occur if the box's movement is constrained (e.g., to rotate only about its origin and to maintain its origin within its parent.)

In the present implementation of the "worlds-within-worlds" paradigm, each world in the hierarchy is represented by a box that is assigned a "geometry-event handler" and an "expose-event handler". The geometry-event handler constrains the box's position so that its origin always lies within the parent's box, and forwards information about the geometry changes down the hierarchy. The expose-event handler draws the box's axes. A box that contains a surface is assigned an additional event handler that draws the surface in response to expose events. This event handler recomputes a representation of the function whenever any of the function's variables have changed by more than a specified amount. The dynamic tick marks are contained in boxes that are siblings of the box whose position they control and report. Each tick-mark box has a geometry-event handler that supports constrained motion along the axis on which it is located and that propagates an event to the box it controls. Likewise, a regular box's geometry-event handler propagates events to the tick marks that represent its position.

While, as described, a preferred embodiment of the invention may involve the display of 3-D analoguss of windows, the use of other window systems and other display means is not precluded. Also, there are applications in which curvilinear coordinate systems are preferred, or coordinate systems having nonlinear (e.g., logarithmic) scales. Display of three- and higher-dimensional sets may involve projection, e.g., by perspective or parallel planar projection, and projection systems may provide smooth or abrupt change from one type of projection to another. Alternatively, a true 3-D system may use holography, a vibrating mirror, or other suitable means.

A value may be represented by means other than spatial means, e.g., by light intensity or color. For example, in a 3-D display of a surface, coloring of a surface may correspond to an additional variable to which no spatial coordinate has been assigned. Shading or coloring may also be used redundantly in correspondence with a spatially represented variable; for example, if such a variable belongs to a parent coordinate system, the over-all color of a displayed surface may change as the displayed system moves in the parent system. Among further possibilities is the use of icons instead of or in addition to points, curves, and surfaces, with the attributes of an icon as parameters which may correspond to variables. Also, all or part of a display may consist of nonvisual signals, e.g., audible or kinesthetic signals.

While a DataGlove is a particularly versatile interaction means, other interaction devices, e.g., a joy stick, a mouse, a 3-dimensional Flying Mouse™, or any other means for capturing user input may be used. Furthermore, interaction may be under program control, e.g., for movement directed by input data. And finally, a system may allow for use by multiple users simultaneously.

We claim:

1. A computer method for displaying multivariate data, comprising first computing based on computer input of the multivariate data, for forming a first, 3-dimensional display in a first coordinate system corresponding to a first subset of variables, and second computing based on the computer input of the multivariate data and dependent on the first computer processing, for displaying said first display in a second coordinate system corresponding to a second subset of variables such that a designated point of said first coordinate system is located at a point in said second coordinate system, with the coordinates of said point in the second coordinate system fixing a set of variables that are used in determining said first display, and third computing for manipulating said first display by geometric transformation.

2. The method of claim 1, wherein said second coordinate system, in which said first coordinate system is displayed, in turn is displayed in a third coordinate system corresponding to a third subset of variables such that a designated point of said second coordinate system is positioned at a point in said third coordinate system.

3. The method of claim 1, wherein said manipulating comprises a change of scale about its designated point of a coordinate system for the sake of ease of viewing.

4. The method of claim 1, wherein said manipulating comprises rotation of a coordinate system about its designated point for the sake of ease of viewing.

5. The method of claim 1, wherein manipulating comprises translating a coordinate system relative to its parent coordinate system.

6. The method of claim 1, wherein said manipulating comprises use of a DataGlove device.

7. The method of claim 1, further comprising use of a visual probe in said first display for determining the value of a data set.

8. The method of claim 1, further comprising comparing said first display with a further display.

9. The method of claim 1, further comprising use of magnification means for inspecting said first display.

10. The method of claim 1, said multivariate data representing variables and values of financial transactions.

11. The method of claim 10, said financial transactions comprising foreign-currency options trades.

12. A computer system for displaying multivariate data, comprising data input means, computing means in communication with said data input means, and output display means in communication with said computing means, said computing means comprising:

first means for forming a first, 3-dimensional display in a first coordinate system corresponding to a first subset of variables, second means for forming a second display comprising said first display in a second coordinate system corresponding to a second subset of variables such that a designated point of said first coordinate system is located at a point in said second coordinate system, with the coordinates of said point in the second coordinate system fixing a set of variables that are used in determining said first display, and third means for manipulating said first display by geometric transformation.

13. The system of claim 12, wherein said computing means further comprises means for forming a display comprising a succession of coordinate systems including said first and second coordinate systems, successive coordinate systems being nested such that the coordinates of each coordinate system which includes a successor coordinate system are different from the coordinates of said successor coordinate system.

14. The system of claim 12, wherein said computing means further comprises means for forming a display comprising a plurality of coordinate systems including said first, said second, and an additional first coordinate system, said additional first coordinate system corresponding to said first subset of variables and being displayed in said second coordinate system such that a designated point of said additional first coordinate system is located at a further specified point in said second coordinate systems with the coordinates of said further specified point fixing a set of values of the second subset of variables that are used in determining the display in said additional first coordinate system.

15. The method of claim 1, further comprising additional first computing for forming an additional first display in an additional first coordinate system corresponding to said first subset of variables, and displaying said additional first display in said second coordinate system such that a designated point in said additional first coordinate system is located at a further specified point in said second coordinate system, with the coordinates of said further specified point fixing a set of values of the second subset of variables that are used in determining said additional first display.

* * * * *

UNITED STATES PATENT AND TRADEMARK OFFICE
CERTIFICATE OF CORRECTION

PATENT NO. : 5,524,187
DATED : June 4, 1996
INVENTOR(S) : Steven K. Feiner et al.

It is certified that error appears in the above-indentified patent and that said Letters Patent is hereby corrected as shown below:

On the title page,
Item [54] and column 1: "WORLDS-WITHIN-WORLDS NESTED DISPLAY AND INTERACTION SYSTEM AND METHOD" should read -- SYSTEM AND METHOD FOR INTERACTIVE HIERARCHICAL DISPLAYING AND MANIPULATING MULTI-DIMENSIONAL DATA --. Col. 1, line 15, "display" should read -- display of --; line 19, "65 1965" should read -- 65, 1965 --; line 45, "Varying" should read -- varying --. Col. 3, line 64, "interest; rates" should read -- interest rates --. Col. 4, line 35, "Comparison" should read -- comparison --; line 66, "lowered" should read -- lowered to --. Col. 6, line 4, "analoguss" should read -- analogues --; line 9, "analoguss" should read -- analogues --; line 41, "On" should read -- on --. Col. 7, line 43, "analoguss" should read -- analogues --. Col. 10, bridging lines 2-3, "systems" should read -- system, --.

Signed and Sealed this

Third Day of December, 1996

Attest:

*Attesting Officer*

BRUCE LEHMAN
*Commissioner of Patents and Trademarks*